Patented Mar. 10, 1936

2,033,836

UNITED STATES PATENT OFFICE 2,033,836

FIXATION OF DYESTUFFS ON TEXTILE FIBERS

Louis Amédée Lantz and Alexander Lang Morrison, Manchester, England, assignors to The Calico Printers' Association Limited, Manchester, England, a British company No Drawing. Application January 30, 1935, Serial No. 4,183. In Great Britain December 22, 1933

10 Claims. (Cl. 8—5)

This invention relates to the fixation with respect to their fastness to washing, of dyestuffs upon regenerated cellulose rayon, cotton and other natural fibers of vegetable origin, and real silk, or upon a mixture or mixtures of such materials. The invention also relates to the fixation on vegetable fibers of dyestuffs which have normally little or no affinity for such fibers.

With the exception of the dyestuff class known as vat colours, none of the other dyestuff groups permits of the production of a comprehensive range of shades which are fast both to exposure to light and to severe washing treatment. In particular, amongst the substantive dyestuffs used for the dyeing and printing of vegetable fibers, there is at present available a large number of fast-to-light dyes covering most of the requirements regarding shade and dischargeability, but of very poor to moderate fastness to washing. Conversely such direct dyestuffs producing dyeings which can be made fast to washing by diazotizing and developing, or by coupling with a diazo compound are, with a few exceptions, of only poor to moderate fastness to light. Similarly, amongst the acid dyestuffs used for the dyeing and printing of silk, there are many possessing good fastness to light and otherwise desirable properties, such as distinctive shade and/or dischargeability, but being at the same time very loose to washing.

We have found by research and experiment that the fastness to washing of the fibers or materials (hereinafter termed fibers) before indicated when dyed or printed is increased or the fixation of dyestuffs having normally little or no affinity for the fibers is made possible if said fibers are impregnated with an aqueous solution of components leading to the formation of a synthetic resin, the impregnated fibers being dried and heated to a relatively high temperature for a short period of time for the formation of the insoluble resin on and in the fibers.

Our invention comprises impregnating the dyed or printed fibers with an aqueous solution of components leading to the formation of a synthetic resin, the impregnated fibers being dried and heated to a relatively high temperature for a short period of time for the formation of the insoluble resin on and in the fibers.

Our invention further comprises impregnating the fibers simultaneously with a dyestuff and an aqueous solution of components leading to the formation of a synthetic resin, followed by a heat treatment to insolubilize the resin.

Our invention further comprises the impregnation of the fibers with an aqueous solution of (1) a mixture of formaldehyde with (a) phenol or a derivative, (b) urea or a derivative, or (c) with dicyanodiamide, or preferably (2) with an intermediate condensation product of 1 (a), 1 (b) or 1 (c).

Our invention further comprises the impregnation of the fibers with an aqueous solution of (1) formaldehyde with phenol or a derivative thereof, or an intermediate condensation product thereof, together with a suitable catalyst, preferably of an alkaline nature, (2) formaldehyde with urea or a derivative thereof, or with dicyanodiamide, or an intermediate condensation product thereof together with a suitable catalyst, preferably of an acid nature, or capable of liberating an acid during the process.

Our invention further comprises the heating of the impregnated fibers to a temperature of about 180–210° C. for about 30–60 seconds.

Our invention further comprises the application of the phenolic or amidic component and of the aldehydic component separately after the dyeing or printing; or the phenolic or amidic component may be applied along with the dyestuff and together with, if desired, a catalyst or condensing agent, the aldehydic component being applied afterwards either in aqueous solution or in gaseous form in an atmosphere of steam. The resin is then insolubilized.

The degree of improvement in fastness to washing effected by the treatment varies somewhat from dyestuff to dyestuff, but it is on the whole more marked, and obviously of greater value, the lower the initial fastness to washing of a dyestuff. Thus a substantive dyestuff which when dyed or printed on cotton, viscose or cuprammonium rayon, would not stand even the mildest soaping treatment without appreciable fading, becomes in many cases as fast to washing as dyeings produced by means of diazotized and developed or coupled substantive colouring matters. It is even possible to achieve the fixation on vegetable fibers of dyestuffs which normally have no affinity for such fibers, as for example, acid dyestuffs. This is a most important and unexpected advantage of our process. With regard to vegetable fibers, the process is therefore particularly applicable to the production of shades of good all-round fastness, if applied to fixation of fast-to-light substantive or acid colours, in order to render them fast to washing.

In the same way the process is applicable to the improvement of the fastness to washing of other types of dyeings or prints, such as obtained with basic dyestuffs or mordant dyestuffs. In some cases, especially with basic dyestuffs, the fastness to light is also materially improved.

Example 1

50 parts by weight of phenol and 2 parts by weight of potassium carbonate are dissolved in 50 parts by volume of 40% formaldehyde solution, and the mixture boiled for 5 minutes. After cooling, 90 parts of water are added. A viscose artificial silk fabric dyed with 2% Chlorazol Fast Helio BK (Colour Index No. 319) is impregnated with this solution, dried and heated at 200° C. for 50 seconds. The colour withstands the action of boiling soap solution.

*Example 2*

25 parts by weight of urea and 10 parts by weight of ammonium acetate are dissolved in 115 parts of water, and 100 parts by volume of 40% formaldehyde solution added. The mixture is allowed to react for 30 minutes at room temperature. A cuprammonium artificial silk fabric dyed with 2% Chlorazol Fast Scarlet 4BS (Colour Index No. 327) is impregnated with this solution, dried and heated at 200° C. for 30 seconds. The colour withstands washing in boiling soap solution.

*Example 3*

37 parts by weight of dicyanodiamide are made to react in mildly alkaline medium with 65 parts by volume of 40% formaldehyde solution at 50–60° C. for 15 minutes. The solution after neutralizing is made up with water to 190 parts by volume and 25 parts by volume of 80% acetic acid, and 38 parts by volume of 40% formaldehyde solution added. A viscose artificial silk fabric dyed with 2% Diamine Rose FFB (Colour Index No. 128) is impregnated with this solution, dried and heated at 200–205° C. for 30 seconds. The colour is rendered fast to hot soaping.

*Example 4*

8 parts by weight of urea are made to react with 20 parts by volume of 40% formaldehyde solution in mildly alkaline medium for 15 minutes at 30–35° C. After neutralizing, 4 parts by volume of 40% formaldehyde solution are added and the mixture made up with water to 80 parts by volume. 2 parts by weight of Chlorazol Fast Red K (Colour Index No. 278) are then dissolved in this solution, 10 parts by volume of 80% acetate acid added and the whole bulked with water to 100 parts by volume. A fabric made of a cotton warp and a viscose artificial silk weft is impregnated with this solution, dried and heated at 200° C. for 50 seconds. The colour is fixed in such a manner that it resists washing and soaping at the boil.

*Example 5*

2.5 parts by weight of Lissamine Violet 2RS (Colour Index No. 53) are dissolved in 80 parts by volume of the urea formaldehyde condensate described in Example 4. 10 parts by volume of 80% acetic acid are added and the solution is bulked with water to 100 parts by volume. A cotton fabric is impregnated with this solution, dried and heated at 200–205° C. for 50 seconds. The colour withstands washing and soaping at the boil.

*Example 6*

A natural silk fabric dyed with Lissamine Red 6B (Colour Index No. 57) is padded through a urea-formaldehyde condensate solution prepared as described in Example 2, dried and heated at 200° C. for 30 seconds. The colour withstands washing and hot soaping.

*Example 7*

10 parts by weight of urea, 4 parts by weight of ammonium acetate, and 2 parts by weight of Chlorazol Fast Red K (Colour Index No. 278) are dissolved in water and the solution bulked to 100 parts by volume. A cotton fabric is impregnated with this solution, dried and treated in an atmosphere of steam and formaldehyde vapour for 15 minutes. A heat treatment of 30 seconds at 200° C. completes the fixation of the colour which is rendered fast to hot soaping.

*Example 8*

A cotton fabric mordanted in tannin and dyed with Rhodamine B (Colour Index No. 749) is impregnated with the urea-formaldehyde condensate described in Example 2, dried and heated at 200° C. for 30 seconds. The colour is made fast to prolonged soaping at the boil, and its fastness to light is also increased.

In the appended claims the expression "a synthetic resin of the amidic type" signifies a resin formed by the condensation of formaldehyde with urea, thio-urea, di-cyanodiamide or derivatives thereof but excludes phenol-formaldehyde resins. The expression "vegetable and like fibers" signifies natural or artificial fibers of vegetable origin, such as cotton and artificial silk, and real silk but excludes wool.

What we claim is:—

1. A process for producing dyeings upon vegetable and like fibers fast to washing by dyestuffs which will not normally produce such dyeings upon such fibers, which comprises treatment of the fibers simultaneously with the said dye and with an acidified solution of components capable of condensation to form a synthetic resin of the amidic type, drying said fibers and heating them to a temperature of 180°–210° C. for 30–60 seconds.

2. A process for producing dyeings upon vegetable and like fibers fast to washing by dyestuffs which will not normally produce such dyeings upon such fibers which comprises treatment of the fibers with the said dye and subsequently with an acidified solution of components capable of condensation to form a synthetic resin of the amidic type, drying said fibers and heating them to a temperature of 180°–210° C. for 30–60 seconds.

3. The process claimed in claim 1 wherein the dyestuff specified is an acid dyestuff having normally little or no affinity for the said fibers.

4. The process claimed in claim 2 wherein the dyestuff specified is an acid dyestuff having normally little or no affinity for the said fibers.

5. The process claimed in claim 1 wherein the dyestuff specified is a direct dyestuff having normally an inferior fastness to washing when dyed upon vegetable fibers.

6. The process claimed in claim 2 wherein the dyestuff specified is a direct dyestuff.

7. The process claimed in claim 1 wherein the components specified include formaldehyde in quantity in excess of that necessary to form dimethylol urea condensation compounds.

8. The process claimed in claim 2 wherein the components specified include formaldehyde in quantity in excess of that necessary to form dimethylol urea condensation compounds.

9. The process claimed in claim 1 wherein the impregnated material is treated with gaseous formaldehyde.

10. The process claimed in claim 2 wherein the impregnated material is treated with gaseous formaldehyde.

LOUIS AMÉDÉE LANTZ.
ALEXANDER LANG MORRISON.